April 26, 1955  P. H. FIDELMAN  2,706,884
ESCAPEMENT REGULATOR
Filed April 19, 1949  2 Sheets-Sheet 1
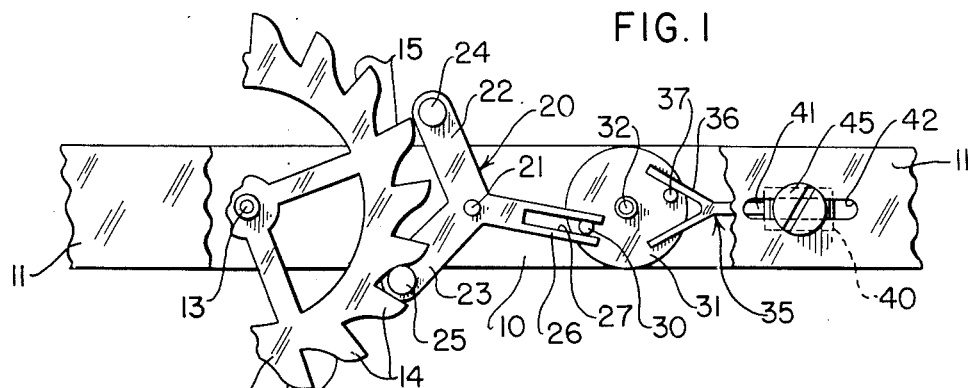
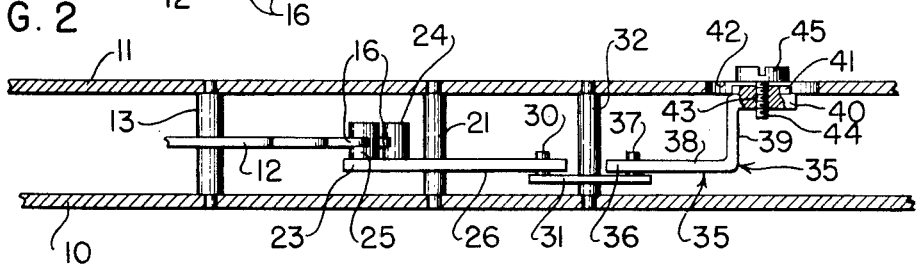
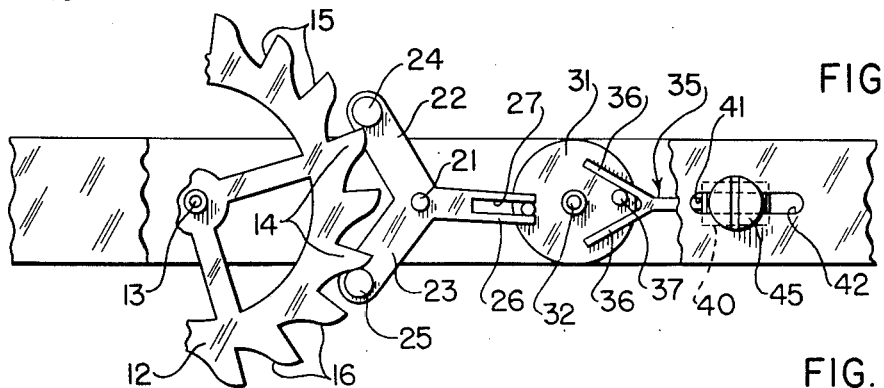
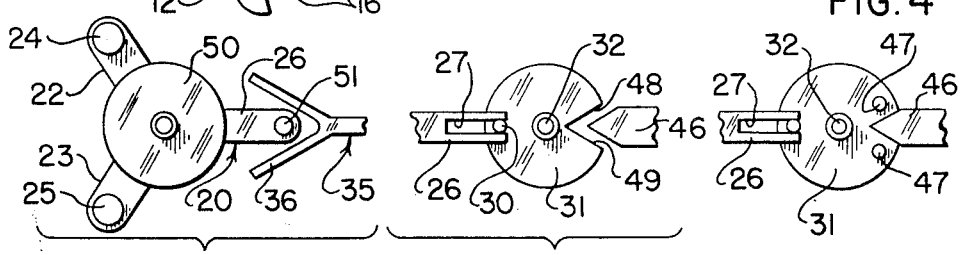
INVENTOR.
Paul H. Fidelman
BY
ATTORNEY April 26, 1955 P. H. FIDELMAN 2,706,884
ESCAPEMENT REGULATOR
Filed April 19, 1949 2 Sheets-Sheet 2

INVENTOR.
Paul H. Fidelman
BY
ATTORNEY

{ # United States Patent Office 2,706,884
Patented Apr. 26, 1955

2,706,884

ESCAPEMENT REGULATOR

Paul H. Fidelman, New York, N. Y.

Application April 19, 1949, Serial No. 88,453

10 Claims. (Cl. 58—117)

The present invention relates to an escapement system for a spring actuated motor or mechanism such as used in horological and other timing instruments and devices, such as described in my copending application, Serial No. 77,331, filed February 19, 1949, now abandoned, and more particularly, to means for regulating the rate of escapement of such mechanism.

In my said copending application, I have described an escapement system wherein a pallet is osciliated to release the scape wheel of the wound spring not by independent means such as a hair spring and balance wheel or pendulum, as conventionally used, but by the unwinding force of the main spring itself. In the escapement system of my said copending application, the rate of escapement is described as retarded by means of a mass associated by or with the pallet, which mass is adjustable as to quantity or area to increase or decrease its momentum; the mass being shown either as mounted on the pallet itself or as an independently pivoted regulator wheel operatively associated with the pallet.

The present invention relates to further or additional means for controlling and regulating the rate of oscillation of the pallet and thereby the rate of escapement, with a view of attaining greater accuracy, constancy and precision in the unwinding of the main or driving spring, as required in timing instruments in general and horological instruments in particular.

It is the object of the present invention to provide regulating means of the character described which are certain, direct, and positive in action and effect.

It is also an object of the present invention to provide regulating means of the character described which are not affected by external and environmental conditions such as temperature and humidity, and require no compensating means for variations in such conditions.

It is another object of the present invention to provide regulating means of the character described which are constant in effect; compensating for the variation in the tension or torque of the main spring as it is in various stages of unwinding.

It is still another object of the present invention to provide regulating means of the character described which are of simple construction, which are easy and simple to assemble in operative association with the other parts of the escapement mechanism and with the timing mechanism in general and are, therefore, economical to use, and which are conveniently arranged and located in ready accessibility for adjustment to make the regulating of the timing mechanism a simple operation that does not require any particular skill or training.

It is a further object of the present invention to provide a regulating mechanism which, while primarily intended for use with the escapement system of my said copending application is also adaptable for use with equal advantage in association with the conventional hair spring and balance wheel mechanism.

The foregoing and other advantages and superiorities of the escapement regulating means of the present invention will become more readily apparent to those skilled in the art from the several embodiments thereof shown in the accompanying drawing and from the description following. It is to be understood, however, that such embodiments are shown by way of illustration only, to make the principles and practice of the invention more readily comprehensible and without any intent of limiting the invention to the specific details therein shown.

In the drawings:

Fig. 1 is a fragmentary, more or less diagrammatic top plan view, partly broken away, of an escapement system and regulating means of the present invention shown set in one adjustment;

Fig. 2 is a vertical section taken through the assembly of Fig. 1;

Fig. 3 is a view similar to that of Fig. 1, showing the same assembly with the regulating means set in another adjusted position;

Fig. 4 is a fragmentary, more or less diagrammatic, top plan view of a modified form of regulating means;

Fig. 5 is a view similar to that of Fig. 4 of another modified form of regulating means;

Fig. 6 is a view similar to that of Fig. 3 of still another modified form of regulating means;

Figure 7:
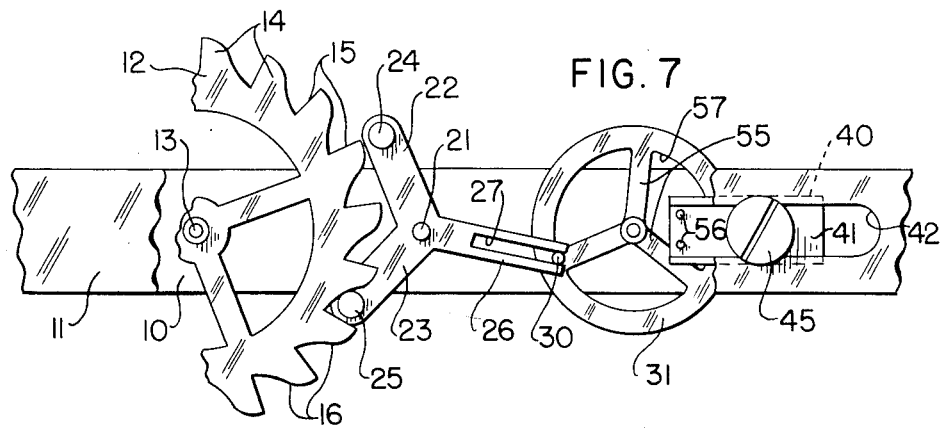
Fig. 7 is a fragmentary, more or less diagrammatic, top plan view of yet another modified form of regulating means, including resilient elements to compensate for the tension variation in the main spring.

Referring more particularly to the accompanying drawings, with particular reference to Figs. 1, 2 and 3 thereof, in which are illustrated an escapement system together with one form of the regulating means of the present invention, there is shown in these figures a bottom bridge member 10 and a top bridge member 11, between which is disposed a scape wheel 12, fixed on a staff 13, which is rotatably supported between the bridge members 10 and 11, in the conventional manner. The connection of the scape wheel to the driving or main spring, which is readily understood by and well known to those skilled in the art is, for these reasons, not shown.

The scape wheel 12 is formed with teeth 14, separated by spaces 15, having their edges facing the direction of movement, which edges are designated as 16, of a sloping or angular arrangement, adapted to have pallet teeth slide therefrom.

Also mounted between the bridges 10 and 11 is a pallet, generally designated as 20, on a staff 21, which is pivotally supported between said bridges 10 and 11. The pallet 20 is formed with the conventional pallet arms 22 and 23, carrying, respectively the pallet pins 24 and 25, and arranged in a conventional manner that when one of the pins such as 25 is disposed in a space 16 the other of the pins as 24 is free of the teeth 14; the teeth 24 and 25 alternately reposing in a space 15 and pushed out from such space by the sloping face 16 of the adjacent tooth 14, as the scape wheel 12 rotates under the force of the main spring.

The pallet 20 is formed with a rear arm 26, having a guide slot 27, opening into the end edge thereof, in which slot 27 there is disposed the pin 30, mounted on a surface of a regulator wheel or disc 31, rotatably supported to the rear of the pallet 20 on a staff 32, which is pivotally mounted between the bridges 10 and 11, so that as the pallet 20 is moved or oscillated by the escape wheel 12, the wheel 31 is oscillated in turn, its mass providing the desired momentum to provide the maximum retardation of the pallet oscillation that may be desired. The mass of the regulator wheel 31 may be predetermined before its assembly in the system or may be adjusted after it is assembled, by increasing its mass or by varying the area over which its mass is distributed, as described in my said copending application.

I now provide an additional regulator, generally designated as 35, which is variable, and which acts directly on the regulator wheel 31 to adjustably limit the length, or magnitude and thereby the time of its oscillation to thereby limit the length and time of the oscillation of the pallet 20. Such regulator 35 may comprise a V-shaped member 36 disposed adjacent a surface of the wheel 31 and receiving between its arms a pin 37 that may be set in the surface of the disc 31 in diametrically opposed position to the pin 30. The V-shaped member 36 may be provided with a rearwardly extending arm 38, having an upwardly offset portion 39, which carries at its end in rearwardly offset relation thereto a block 40, extending to a point directly below the upper bridge 11 on which block there is formed a rectangular stud 41, which fits snugly in a guide slot 42, formed in the bridge 11. The block 34 is formed with a threaded opening 43, in which is received an adjusting screw 44, having an enlarged head 45, which will overlie the edges of the guide slot 42.

It will be readily apparent that the regulating member 35 may be adjusted in position by means of the screw 44 to move the V member 36 in the direction of the regulator wheel 31 to narrow the oscillating distance of the pin 37, thereby increasing its rate of oscillation, or away from the regulator wheel 31, to increase the distance of the movement of the pin 37, to thereby increase the distance of oscillation of the regulator wheel 31 and decrease its rate of oscillation.

It will be noticed that when the regulator is moved away from the wheel 31 and the distance of oscillation increased, the distance of oscillation of the pallet 20 will likewise be increased and its pins will enter the bottom of the spaces 15, as shown in Fig. 1. On the other hand, when the distance of oscillation of the regulator wheel 31 is decreased by moving the regulator in the direction of the wheel 31, the pallet strokes will also be shortened, so that its pins 24 and 25 at the maximum of the pallet stroke, will not enter to the bottom of the spaces 15, as shown in Fig. 3; the pallet stroke thus being reduced and its rate increased.

It will be apparent to anyone skilled in the art that the regulator such as 35 may be associated with a hair spring and balance wheel mechanism to positively limit the movement and regulate the balance wheel, regardless of the hair spring tension, to provide direct and accurate regulation of the rate of escapement.

In Figs. 4, 5 and 6 I have shown different forms of the vernier type regulator 35, all of them having in common an oscillating member, a fixed element and a pair of diverging edges, in which the fixed element and diverging edges are adjustably movable one relative to the other.

Thus in Fig. 4 I have replaced the V-shaped member 36 by a wedge 46 which is movable between 2 pins 47, set into the regulator wheel 31.

In the embodiment of Fig. 5 the 2 pins 47 are replaced by a wedge or sector cut out from the wheel 31, its converging edges 48 and 49 engaging the fixed point of the wedge 46.

In the embodiment of Fig. 6 I have shown the construction wherein regulating wheel or mass 50 is mounted upon the pallet 20 and the rear arm 24 of the pallet carries a pin 51 in place of a slot which pin is directly engaged by the V-shaped member 36 of the regulator 35.

In Figs. 7 through 11, inclusive, of the drawings I have shown further modifications of the escapement regulating means of the present invention, which modifications include a resilient element or elements that provide a kick or recoil at the end of the oscillating stroke, to compensate for any variation in the tension of the main spring during its various stages of unwinding.

Figure 8:
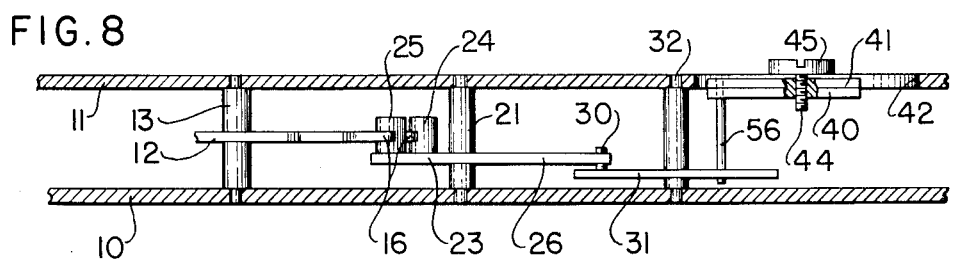
Fig. 8 is a vertical sectional view of the regulating means of Fig. 7.

Thus in Figs. 7 and 8 I have shown an arrangement wherein the regulator wheel 31 is of the balance type in which a pair of diverging edges are provided by the facing edges of two contiguous spokes 55, and the block 40 carries at its forward end one or a pair of depending resilient pins 56, which are adjustably movable within the space 57 between the spokes 55 to adjustably limit the oscillation of the balance wheel 31.

It will be readily seen that the spokes 55, as they alternately hit the pin 56 at the end of an oscillating stroke, will be resiliently recoiled in the direction of the new stroke, regardless of the tension under which the oscillation of the wheel 31 takes place.

Figure 9:
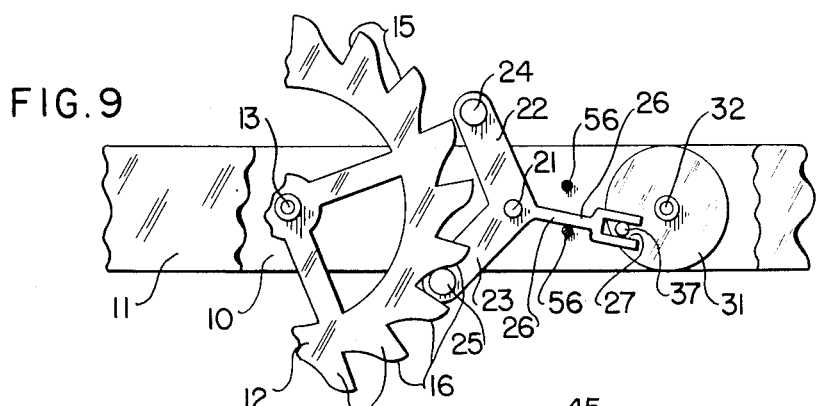
Fig. 9 is a view similar to Fig. 7 of a modified form of resilient regulating means.
Figure 10:
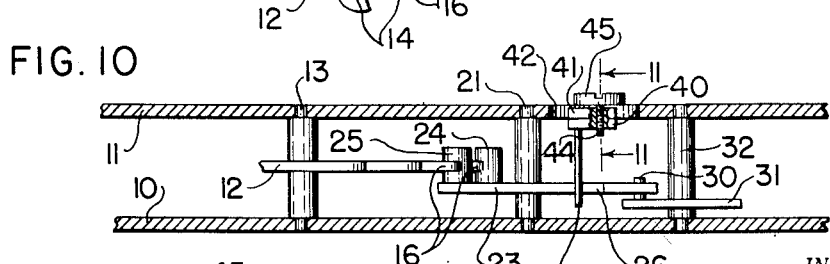
Fig. 10 is a vertical sectional view of the regulating means of Fig. 9.
Figure 11:
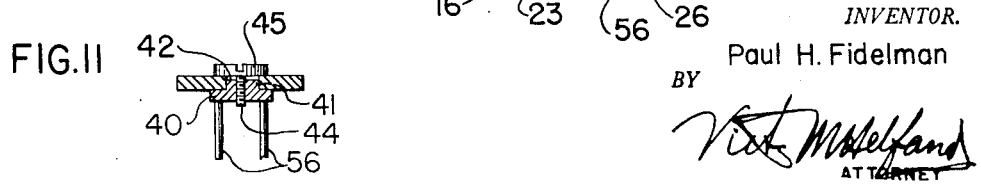
Fig. 11 is a section taken on line 11—11 of Fig. 10.

In the embodiment of Figs. 9 through 11, inclusive, the resilient regulating means, instead of being applied to a regulator wheel, are applied directly to the pallet; the adjustable block 40 being disposed directly over the pallet arm 26, with the pins 56 arranged one to each side of said pallet arm 26. As will be readily understood, the regulating of the pallet stroke is affected through the movement of the pins 56 toward the balance wheel 31 to shorten the stroke, or away from the balance wheel 31 to lengthen it. The resilience of the pins 56 will tend to provide a resilient recoil at the end of each oscillating stroke of the pallet arm 26, in the same manner as described in connection with the embodiment of Figs. 7 and 8.

It may here be stated that the pins 56 may be adjustably mounted in the lower bridge 10 instead of the upper bridge 11 as shown. It may here be further stated that other embodiments of the invention such as the embodiments of Figs. 1, 4 and 5 may be formed to provide a resilient recoil by making the pins 37, 47 and 51, respectively, resilient and by suitably spacing the cooperating adjustable means that come in contact with such pins from the base of the pins.

This completes the description of the several embodiments of the escapement regulating means of the present invention. It will be readily apparent that numerous variations and modifications of the several escapement regulating means of the present invention may be made by anyone skilled in the art in accordance with the principles of the invention hereinabove set forth and without the use of any inventive ingenuity. I desire, therefore, to be protected for any and all such variations and modifications that may be made within the spirit of the present invention and the scope of the claims hereto appended.

What I claim is:

1. In an escapement system having a scape wheel and a pallet operatively associated with said scape wheel, means for regulating the movement of said pallet including an oscillating mass member operatively associated with said pallet and a member adjustably movable relative said mass member, one of said members having a pair of diverging spaced edges and the other of said members having a fixed element adapted to alternately engage said diverging edges as said mass member oscillates to thereby limit the oscillating stroke of said mass member.

2. In an escapement system having a scape wheel and a pallet operatively associated with said scape wheel, means for regulating the movement of said pallet including an oscillatable regulator wheel member operatively associated with said pallet and a member adjustable relative said regulator wheel member and overlapping the same, one of said members having a pair of diverging spaced edges and the other of said members including means for alternately engaging said diverging edges as said regulator wheel is oscillated to limit the oscillating stroke thereof.

3. In an escapement system having a scape wheel and a pallet operatively associated with said scape wheel, means for regulating the movement of said pallet including an oscillatable regulator wheel member operatively associated with said pallet and a member adjustable relative said regulator wheel member and overlapping the same, one of said members including a pair of diverging edges and the other of said members including resilient means for alternately engaging said diverging edges as said regulator wheel is oscillated to limit the oscillating stroke thereof.

4. In an escapement system having a scape wheel and a pallet operatively associated with said scape wheel, means for regulating the movement of said pallet including an oscillatable regulator wheel operatively associated with said pallet and a member adjustably movable relative said regulator wheel said member including a V-shaped forked terminal and an element on said regulator wheel extending between the arms of the said V-shaped terminal and adapted to alternately engage said arms as said regulator wheel oscillates, to thereby limit the oscillating stroke thereof.

5. In an escapement system having a scape wheel and a pallet operatively associated with said scape wheel, means for regulating the movement of said pallet including an oscillatable regulator wheel operatively associated with said pallet and a member adjustably movable relative said regulator wheel said member including a V-shaped forked terminal overlapping said regulator wheel and a resilient element on said regulator wheel extending between the arms of the said V-shaped terminal and adapted to alternately engage said arm as said regulator wheel oscillates, to thereby limit the oscillating stroke thereof.

6. In an escapement system having a scape wheel and a pallet operatively associated with said scape wheel, means for regulating the movement of said pallet including an oscillatable regulator wheel operatively associated with said pallet, and a member adjustably movable relative said regulator wheel, said regulator wheel having a pair of spaced elements thereon, said movable member having a wedge-shaped terminal extending between said elements adapted to have its edges alternately engage the said elements as the said regulator wheel oscillates, to thereby limit the oscillating stroke thereof.

7. In an escapement system having a scape wheel and a pallet operatively associated with said scape wheel, means for regulating the movement of said pallet including an oscillatable regulator wheel operatively associated with said pallet and a member adjustably movable relative said regulator wheel, said regulator wheel having a pair of spaced apart resilient elements, said movable member having a wedge-shaped terminal extending between said resilient elements and adapted to have its edges alternately engage the said resilient elements as the said regulator wheel oscillates, to thereby limit the oscillating stroke thereof.

8. In an escapement system having a scape wheel and a pallet operatively associated with said scape wheel, means for regulating the movement of said pallet including an oscillatable regulator wheel member operatively associated with said pallet, said regulator wheel having a sector cut out therefrom and a member adjustably movable relative said regulator wheel member, said movable member having a wedge shaped terminal adapted to extend into said cut out sector to alternately contact the edges thereof as said regulator wheel member oscillates.

9. In an escapement system having a scape wheel and a pallet operatively associated with said scape wheel, means for regulating the movement of said pallet including an oscillatable mass element operatively associated with said pallet a member adjustably movable relative said mass member said member having a V-shaped forked terminal said pallet having an arm extending in overlapping relation towards said V-shaped forked terminal and an element on said pallet arm extending between the arms of said forked terminal.

10. The mechanism of claim 9 wherein said element on said pallet arm is resilient.

References Cited in the file of this patent

UNITED STATES PATENTS

| | | |
|---|---|---|
| 165,793 | Cole | July 20, 1875 |
| 306,517 | Pickering | Oct. 14, 1884 |
| 764,137 | Leonard | July 5, 1904 |
| 2,081,727 | Barenyi | May 25, 1937 |

FOREIGN PATENTS

| | | |
|---|---|---|
| 17,187 | Switzerland | June 7, 1898 |
| 19,698 | Switzerland | May 19, 1900 |
| 112,289 | Austria | Oct. 15, 1928 |